Oct. 15, 1957     E. R. SEWELL     2,809,705
PROPELLING MECHANISM FOR LAWN MOWERS
Filed July 14, 1955
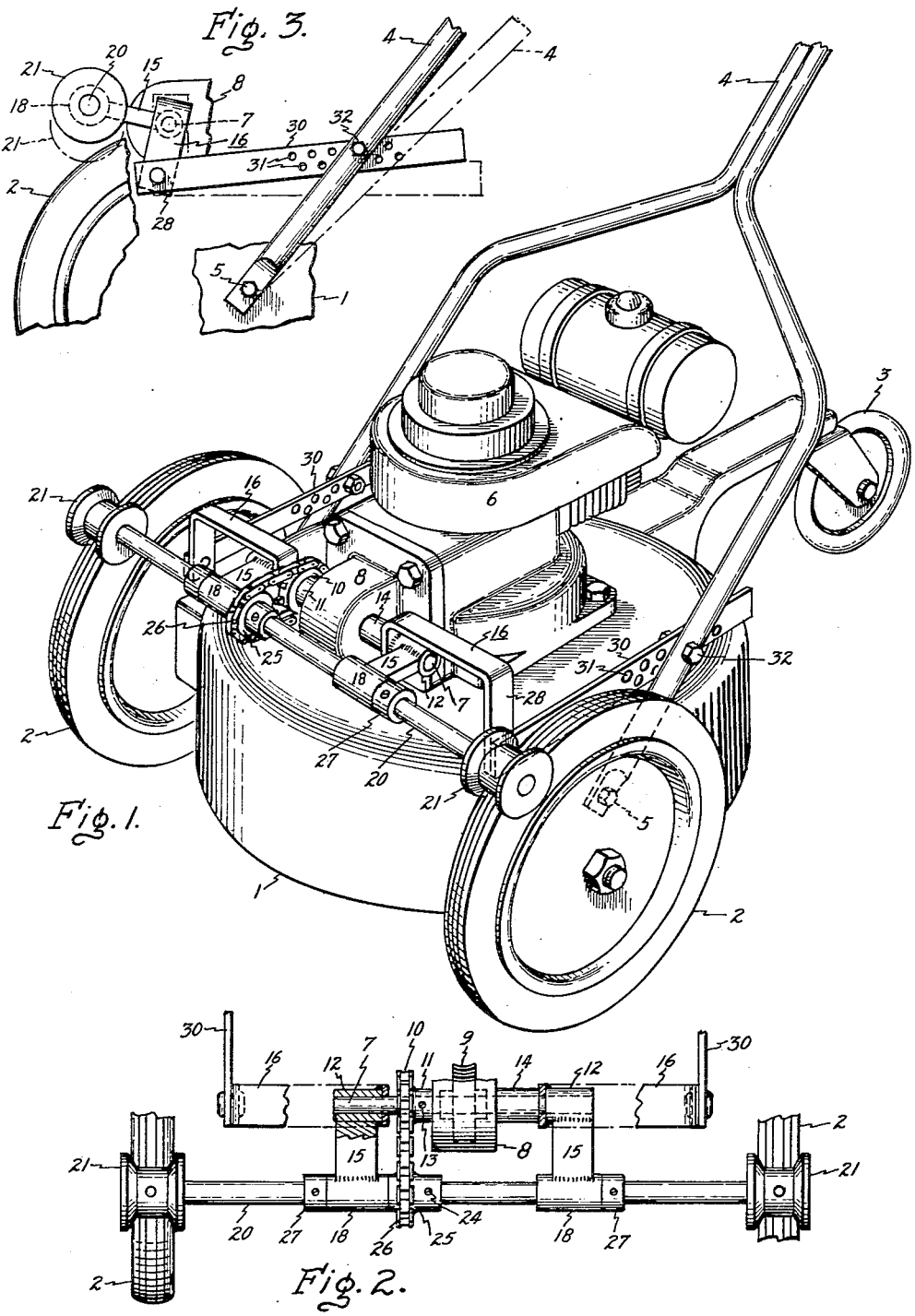

2,809,705

PROPELLING MECHANISM FOR LAWN MOWERS

Edward R. Sewell, deceased, late of Jacksonville, Fla., by Isola Sewell, Jacksonville, Fla., and Marjorie Lucille Holt, Severna Park, Md., co-executrices Application July 14, 1955, Serial No. 522,128

4 Claims. (Cl. 180—19)

The purpose of this invention is to provide means to employ the motor which operates the cutting mechanism of any usual type of power lawn mower to also propel the machine. The invention is adapted to be included as part of the factory assembly or to be added to existing mowers without requiring their substantial modification.

Among the advantages of the invention are that it is inexpensive, has few and simple parts, all easily made and easily accessible in use, is sturdy but of light weight, and can be attached or removed readily with common tools. It is entirely out of the way of the grass being cut.

An important operative advantage is that the ordinary handle of the mower is the only control used. Thus, by moving the handle a short distance the operator can apply any degree of the power available to the travel wheels, or he can instantly reduce or remove the driving power. Consequently, the invention enables the power to be instantly removed from the travel wheels and thus applied entirely to the cutting load if the engine labors or shows signs of stalling in heavy grass.

In case removal of the power drive mechanism is desired, this can be accomplished either as a complete subassembly, or it can be completely dismantled.

In the accompanying drawings which, with the description following, disclose a preferred embodiment of the invention, it is shown as applied to a rotary-type gasoline-driven lawn mower, but it is to be understood that the principles are equally applicable to electric or other drive, and to reel-type mowers. In the drawings:

Fig. 1 is a perspective view showing top, front, and left side of a mower with the invention thereon;

Fig. 2 is a top plan view of the invention, with parts broken away; and

Fig. 3 is a fragmentary left side elevation illustrating practicularly the lever action of the invention.

As here illustrated, the mower blades, not shown, operate within a body casing 1 travelling upon relatively large front wheels 2 with fixed axles and on opposite sides of the casing, and a smaller, swiveled rear wheel or caster 3. A handle 4 is pivoted at its forked lower ends to the side of the casting, as at 5. The power unit is here shown as an internal combustion engine 6.

A power take-off shaft 7, parallel to the axle line of the travel wheels 2, is mounted transversely through a housing 8 on the front of the engine 6, driven therefrom, in this instance, by a worm (not shown) and worm gear 9, Fig. 2. The mechanism associated with housing 8 may, for example, be in accord with that shown in U. S. Patent No. 2,705,002. A sprocket 10 is made fast to the shaft 7 at one side of the housing by means of sprocket hub 11 and set screw 13. Each end of the shaft carries a sleeve bearing 12, that on the left side of the machine being spaced from the side of the housing 8 by a long bushing 14. Two wide bars formed into arms 15 and 16 are fastened, preferably welded, to each of the sleeve bearings. The shorter arm 15 projects radially forward from the side of its sleeve bearing 12 and carries a similar sleeve bearing 18 welded to its outer end, parallel to bearing 12. The longer arm 16, of inverted elongated U-shape, extends upward from the inner end of bearing 12 sufficiently to clear, then horizontally out to in front of the lower end of the handle, then down to approximately as far below the level of the bearing 12 as the shorter arm 15 extends forward. As best seen in Fig. 3, the arms and bearing thus form a bell-crank lever pivoted on the shaft 7 by means of bearings 12 in which the shaft is free to rotate.

A driven shaft 20, rotatable in the bearings 18, extends the full width of the mower, carrying fast upon each end a double flanged drum 21 similar to a V-pulley, adapted for driving contact with the tire of its corresponding travel wheel 2. Sprockets 19 and 25 and a chain 26 transmit power from the take-off shaft 7 to the driven shaft 20. Sprocket 25 is fixed to shaft 20 by set screw 24. Collars 27 bear against the outer ends of the bearings 18 to position the shaft 20 against end motion and to maintain a fixed spacing of arms 15, whereby bearings 12 are prevented from slipping off of shaft 7 and arms 16 are held in position.

On each side a link 30 connects the lower part of the handle 4 with the bottom of the outer portion 28 of the arm 16, so that backward movement of the handle swings the drums 21 down into contact with the travel wheel tires to drive the mower forward as shown in the broken line position of Fig. 3. The handle can be set suitably to the operator's height by selecting the proper bolt hole 31 in the link for the handle connection, bolt 32 being provided to complete the connection. Since the shafts 7 and 20 rotate whenever the engine runs, the handle 4 is the sole travel control. Having the links 30 connected well down on the handle 4 gives a large lever advantage, so that little effort by the operator is necessary to hold the drums 21 as firmly against the tires as may be necessary. Thus even a child can easily run the mower. If the engine threatens to stall in hard going a short movement of the handle instantly removes the driving load, leaving full power available for cutting.

The invention can readily be applied to a power mower without any structural changes to the mower by simply adding a power take-off attachment with a transverse shaft to the front of the prime mover, and drilling bolt holes in the lower part of the handle. All of the mechanism except the rear ends of the links 30 is supported by the power take-off shaft 7. The collars 27 serve the combined function of preventing endwise movement of the shaft 20 and of the sleeve bearings 18, and since each set of elements 18—15—12—16 is a rigid unit, the collars also prevent either set of elements from sliding along the shaft 7. If desired, the drive mechanism can be removed without taking it entirely to pieces by disconnecting the links 30 from the handle 4, loosening the sprockets 19 and 25 and either one of the collars 27, sliding the corresponding sleeve bearing 18 along the shaft 20 until the bearing 12 connected thereto comes off the shaft 7, then swinging the arm 15 and bearing 12 out of the way and sliding the shaft 7 out of the housing 8. Complete dismantling is done by removing both collars, both sprockets, and both drums 21, and sliding both shafts out of their bearings.

A particular safety feature of the self propelled mower in accord with this invention resides in the arrangement by which, if the mower strikes very heavy grass or a tree or wall, the forward motion of the body of the operating individual carries the handle forwardly and upwardly, thereby to disengage the driving drums 21 from the wheels 2.

The drums 21, being flanged, act with clutch action against the wheels 2. Accordingly, as the handle is moved downwardly to start propulsion of the mower, there is some slippage between the drums and wheels as the mower gathers speed, whereas a firm downward force on the handle maintains the mower in motion with no appreciable slippage.

The foregoing description and drawings illustrate a preferred embodiment of the invention as applied to a rotary type power lawn mower, but is will be understood that the invention is not limited to any particular type of mower, nor to the specific elements and arrangements shown, but is subject to modification within the scope of the following claims.

What is claimed as new is:

1. In a traction drive for a power lawn mower of the type having a frame, a motor thereon, travel wheels at opposite sides thereof, and a handle pivoted thereto: a power take-off housing, a power take-off shaft journalled in said housing parallel to the axial line of said travel wheels and extending beyond each side of said housing, a sleeve bearing upon each end of said take-off shaft, arms fixed one to an end and one to a side of each said sleeve bearing and forming therewith a bell-crank lever, another bearing fixed to the end of each said side-fixed arm parallel to said take-off shaft, a drive shaft rotatable in said other bearings, a driving connection between said shafts, friction wheels fixed on said drive shaft each in the plane of a travel wheel; and links each connecting one of said end-fixed arms to said handle near its lower end, whereby motion of said handle in one direction swings said friction wheels against said travel wheels with strong leverage and in the other direction swings said friction wheels away.

2. In a traction drive for a power lawn mower of the type having a frame, a motor thereon, travel wheels at opposite sides thereof, and a handle pivoted thereto: a power take-off housing, a power take-off shaft journalled in said housing parallel to the axial line of said travel wheels and extending beyond each side of said housing, a sleeve bearing upon each end of said take-off shaft, arms fixed one to an end and one to a side of each said sleeve bearing, said end-fixed arms each extending laterally outward above the level of said take-off shaft to about opposite the lower portion of said handle and then downwardly to a distance below said level approximately equal to the length of said side-fixed arm, whereby said arms form a bell-crank lever, another bearing fixed to the outer end of each said side-fixed arm parallel to said take-off shaft, a drive shaft rotatable in said other bearings, a sprocket-and-chain connection between said shafts, friction wheels fixed on each end of said drive shaft each in the plane of a travel wheel; and links connecting one of said end-fixed arms to said handle near its lower end, whereby motion of said handle in one direction swings said friction wheels with strong leverage against said travel wheels and in the other direction swings said friction wheels away.

3. In a traction drive for a power lawn mower having a frame with parallel travel wheels at its opposite sides and a motor having a housing supported on said frame, a power take-off shaft extending from said housing and having an axis parallel to the axis of said wheels, a bearing on said shaft, a second bearing spaced from said first bearing and having an axis parallel to the axis of said shaft, swingable arm means connecting said bearings and forming therewith a unitary arm and bearing assembly, a driven shaft journalled in said second bearing, wheel engageable drive means fixed to said driven shaft, and selectively operable means to swing said assembly about the axis of said power take-off shaft in respectively opposite directions, said selectively operable means comprising a projection rigidly affixed to said assembly and extending in a direction laterally thereof and having a coupling portion disposed below said axis of said power take-off shaft forming with said assembly a bell-crank lever and further comprising a handle pivoted at its lower end to said frame and a link connecting said handle above its lower end to said coupling portion of said projection, said drive means being positioned on said driven shaft drivingly to engage said wheel upon swinging of said handle in a direction downwardly away from said driven shaft and to disengage said wheel upon swinging of said handle in the opposite direction generally upwardly toward said driven shaft.

4. In a traction drive for a power lawn mower having a frame with parallel travel wheels at its opposite sides and a motor having a housing supported on said frame, a power take-off shaft extending from said housing and having an axis parallel to the axis of said wheels, a bearing on said shaft, a second bearing spaced from said first bearing and having an axis parallel to the axis of said shaft, swingable arm means connecting said bearings and forming therewith a unitary arm and bearing assembly, a driven shaft journalled in said second bearing, wheel engageable drive means fixed to said driven shaft, and selectively operable means to swing said assembly about the axis of said power take-off shaft in respectively opposite directions, said drive means being positioned on said driven shaft drivingly to engage said wheel upon swinging of said arm means in one of said directions and to disengage said wheel upon swinging of said assembly in the opposite direction, said selectively operable means comprising a movable handle for said mower, a link coupled to said handle, a projection fixed to said assembly and having a portion spaced laterally from said axis of said take-off shaft which portion is coupled to said link.

References Cited in the file of this patent

UNITED STATES PATENTS

| | | |
|---|---|---|
| 1,819,791 | Reed | Aug. 18, 1931 |
| 2,328,233 | Schunk | Aug. 31, 1943 |
| 2,522,112 | Gilmour | Sept. 12, 1950 |
| 2,523,439 | May | Sept. 26, 1950 |
| 2,623,603 | Cutlan et al. | Dec. 30, 1952 |
| 2,691,421 | Swanson | Oct. 12, 1954 |
| 2,705,002 | Bosma | Mar. 29, 1955 |